Aug. 14, 1951     I. TREPANIER     2,563,888
SPRING TYPE CLUTCH MECHANISM
Filed March 1, 1946
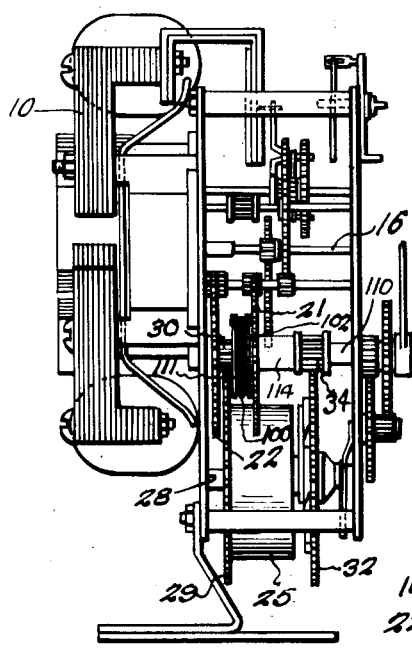
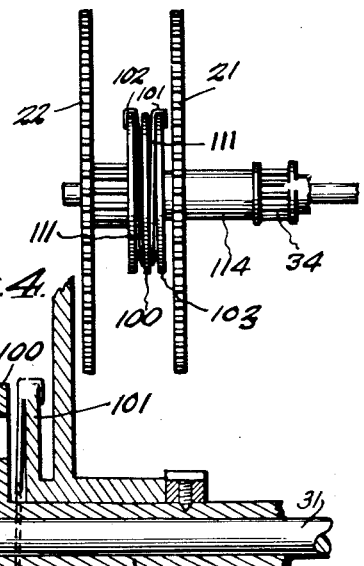
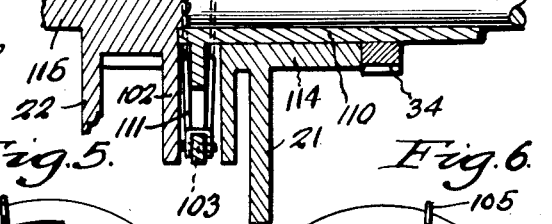
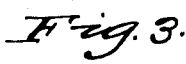
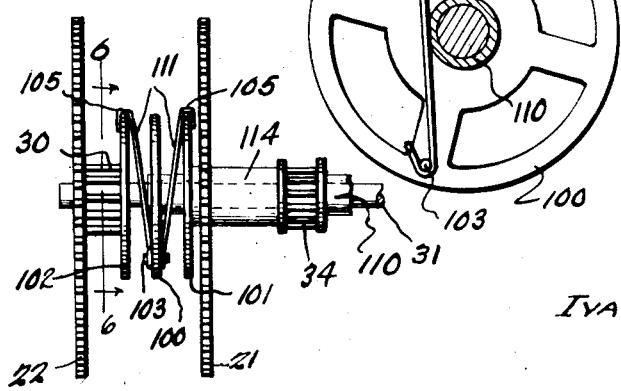
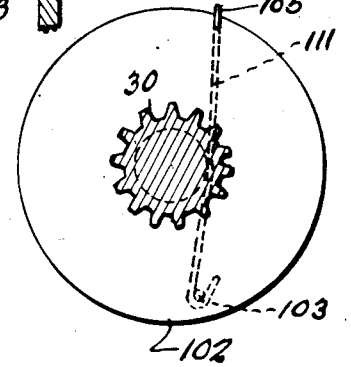
Inventor
IVAN TREPANIER
By
Attorneys Patented Aug. 14, 1951

2,563,888

UNITED STATES PATENT OFFICE 2,563,888

SPRING TYPE CLUTCH MECHANISM

Ivan Trepanier, Ansonia, Conn.

Application March 1, 1946, Serial No. 651,368

5 Claims. (Cl. 192—51)

This invention relates to an improvement of the electric clock mechanism as described in my earlier Patent No. 2,108,931, dated February 22, 1938, and it has for its special object to improve the coupling mechanism which permits the driving of the clock by two driving mechanisms.

In my earlier patent a clock has been described which is driven by a synchronous electric motor, but is also provided with a spring train drive, so arranged that when the motor ceases to operate—say on account of an interruption in the supply current—the spring train will instantaneously become operative and will continue to drive the clock mechanism without any interruption.

When the synchronous motor is subsequently energized it may take over again and drive the clock mechanism and in this case the motor, in addition to this function, will also wind up the spring, which will thus be kept in permanent readiness for actuating the clock and sustaining its operation whenever a failure of operation on the electric side occurs.

In order to permit the arrangement of two alternately operative sources of driving power for sustaining the drive when one of the sources fails, a coupling or clutch mechanism is necessary for automatically coupling the spring train to the clock mechanism whenever the current supply to the motor should cease. This coupling or clutch mechanism is a very important element as movable clutch members can hardly be used and as a clutch or coupling operated merely by friction is, as a rule, not completely reliable as regards immediate action if the clutch member cannot be moved into engagement and out of it with a certain amount of pressure in the former case.

In my earlier patent, I proposed two clutch couplings each operated by a torsion element. This combination of clutch coupling has certain small defects due to the fact that the torsional element, which produces the required frictional contact, is operative only after a certain angular displacement. Completely separate arrangements are moreover necessary for each pinion or wheel to be coupled with the time shaft in each direction.

It is the main object of the present invention to eliminate all defects and to provide a clutch or coupling mechanism which will be operative in both directions and which will be permanently in readiness without any preceding angular or other displacement to effectively couple rotating members in such a way that rotary motion is transmitted from a driving to a driven member, which driven member, on the other hand, remains permanently free to rotate without reaction on one of the driving members.

Such an arrangement made operative for relative directions of rotation therefore simplifies and markedly improves sustained motion clock works of the type above described.

The invention is illustrated in the accompanying drawing showing one modification thereof. It is, however, to be understood that the fact that merely one modification is shown is not to be considered as limitative. The invention consists essentially in means for producing instantaneous frictional contact and, therefore, engagement of the coupling members upon transmission of power in a given direction, while maintaining disengagement and permitting free motion without any reaction between the members to be coupled if the driving power is applied in any other way.

This principle may be realized with means not specifically described but nevertheless forseshadowed by this specification for the expert skilled in this art and these further means or modifications, as far as covered by the annexed claims do not form a departure from but are part of the invention.

It is further to be understood that the coupling mechanism which is hereafter described in connection with electric clocks may be used for other purposes of a different character and is not limited to its application for electric clocks.

In the accompanying drawing:

Figure 1 is a side view of a clock mechanism such as described in detail in my earlier Patent 2,108,931, dated February 22, 1938, provided with the clutch coupling mechanism according to my present invention.

Figure 2 is a side view on an enlarged scale of the coupling mechanism when inserted between the wheels driving the time shaft.

Figure 3 is a side view similar to that in Figure 2 in which the disks of the coupling have been drawn apart. This view does not correspond to an operative position, but the parts are drawn apart to show the insertion and position of the spring or wire element of the coupling.

Figure 4 is a sectional view on an enlarged scale of the disk elements of the coupling with the spring member inserted between them, the other elements being shown as partly broken away.

Figure 5 is a side view of the central disk.

Figure 6 is an enlarged side view of one of the side disks which carries a pinion with the latter insertion, the section being taken along the line 6—6 of Figure 3.

The clock mechanism in general is essentially identical with the mechanism described in Patent No. 2,108,931, and need not be described here in detail. The essential parts are the induction motor 10 driving a shaft 16 which in its turn by intermediate pinions and wheels drives a center gear wheel 21 rotatable about the time shaft 31. The reference letters used to designate these and other parts and components are identical with those used in the above-named patent.

In addition to this driving mechanism a spring train is provided consisting of the conventional coiled spring enclosed in a drum 25 and fixed on a shaft 28. The drum is provided with a gear wheel 29 meshing with a pinion 30 solidary with a second center wheel 22 on the time shaft 31.

The center wheel 21 driven by the motor drives, through the medium of the present clutch mechanism, a pinion 34 meshing with a gear wheel 32. The latter by means of a special mechanism (not shown) described in the aforesaid earlier patent winds up the spiral spring when the motor is running.

According to the present invention the two center wheels 21 and 22 are alternately coupled with the time shaft 31 or to a member connected therewith by means of the frictional clutch coupling according to the invention.

This clutch coupling consists of a central disk or supporting member 100 hereinafter termed driven disk which is fixedly mounted on a sleeve member 110 which is either identical with or coupled with the time shaft 31. On each side of said disk 100, a further disk or driving member 101 and 102, respectively, is arranged. The disks are hereinafter termed driving disks. One of said disks 102 is integral with the pinion 30 and the center wheel 22. The other disk 101 is integral with the second center wheel 21.

The center wheel 22 together with disk 102 is mounted on a central axle 115 which is supported in an appropriate manner in the frame and may be journaled on one side within the sleeve 110.

The center wheel 21 and the disk 101 are both integral with a sleeve 114 surrounding sleeve 110 the latter carrying the pinion 34.

The central disk 100 carries a pin 103 near its outer circumference which projects outwardly for a short distance on both sides of the disk 100 as will be clearly seen in Figure 4. These two projecting ends of the pin serve as a fixing and holding means for a fine steel wire 111 which is used for coupling the disks.

The said wire rests upon and is bent around the thin circumferential edge of the side disks 101 and 102 (as seen in Figures 3 and 4) at 105 on a point which is located approximately opposite the point at which the pin 103 is located. It runs from the hooked or bent part 105 resting for instance on the edge of disk 101 through the space between the said disk and the central disk 100 towards the pin 103 on the latter, passing one side of the sleeve 110 to reach the pin which is located at a point very nearly diametrically opposite to the point 105. The wire is then bent or so shaped as to form a hook or an eyelet around the laterally projecting end of the pin 103 on one side of disk 100. The wire 111 then passes, if the central disk is provided with spokes as shown, through the space between the spokes, or through a cut or hole provided in the disk 100, if a full disk is used, to the other side of said central disk. It is again bent, provided with a hooked portion or so shaped as to form an eyelet around the projecting end of pin 103 on the other side of disk 100. The winding of the wire 111 around both projecting ends of the pin 103 provides a firm anchorage for the same on the pin.

The wire then runs across the disk, passing through the space between the central disk 100 and the lateral disk 102 and passing around the sleeve 110 and in contact with the same at a point very nearly diametrically opposite to the point at which the wire section on the other side is passing. Its end is then bent so as to embrace the circumferential edge of disk 102.

When viewed from the side the wire 111 is V-shaped, its apex being at the pin 103 while the legs are spaced apart by the disk 100. The hooked or bent ends 105 resting on the circumferential edges of the disks 101 and 102 are thus inclined with respect to the diameter of the disk passing through the point on which they are seated.

Each lateral disk 101, 102 can be moved in one direction practically without resistance and without effecting any coupling while it will be coupled with the central disk immediately when moved in the other direction.

The direction in which a lateral disk 101, 102 may be moved without being coupled is that in which the hooked or bent end 105 of the wire is moved away from the sleeve. It will be understood that this movement will tend to lift the hooked end 105 from the circumferential edge and will thus reduce or eliminate any existing friction. Conversely any movement of the lateral disk in the other direction tends to bend the wire section on this side to press the hooked end 105 on the circumferential edge of the lateral disk and to produce a heavy friction.

If the synchronous electric motor, therefore, drives wheel 21 in the required direction the lateral disk 101 which leads with respect to the central disk will be coupled with the latter and sleeve 110, which is coupled with the time shaft 31, is rotated. The electric motor thus drives the time shaft directly. As the pinion 34 on the sleeve 110 meshes with wheel 32, the coiled spring will be wound up during the operation of the motor as described in the earlier patent above referred to. If the synchronous motor stops the spring drive 25 will rotate wheel 29 and thereby drive pinion 30 and center gear wheel 22 integral therewith. The disk 102 will be coupled with the central disk 100 when the lateral disk 102 leads with respect to the central disk in the required direction of rotation. Disk 100 may rotate freely with respect to disk 101 as no coupling can occur when the central disk leads relatively to the lateral disk.

It will be clearly understood that the various details may be changed in many ways as they were mainly introduced to be able to describe a specific example, but that this change or variation is no departure from the invention.

For instance, separate wire sections may be used on each side of the central disk, or functional means other than a wire may be employed such as a hair spring section or the like.

It will be manifest that the coupling as described will secure a number of advantages. A single coupling is required instead of a plurality of couplings. This single coupling will operate with one direction of rotation only although it would, of course, be able to distinguish between different directions of rotation as well. It will be operative when a lateral disk leads with respect to the central disk and inoperative if the central disk leads thus permitting the double sustained power drive in the same direction by always coupling the driving member with the member coupled with the time shaft.

I claim:

1. A frictional coupling mechanism for electric clocks comprising three juxtaposed disks, the central disk being the driven disk and the two lateral disks being driving disks, at least two alternatively active driving means, each driving means being coupled with one of the driving disks, an elastic wire fixed to the central disk with a section extending across the disc and portions of said wire impinging upon the peripheral portions of the driving disks.

2. The frictional coupling as claimed in claim 1 comprising in addition a sleeve carrying the central disk, the elastic wire sections extending across said disk being tangentially positioned with respect to the circumference of said sleeve, the sleeve circumference thus serving as an intermediate support and fulcrum for the bending of the wire section entrained by the periphery of the leading disk.

3. A frictional coupling for electric clocks, comprising three juxtaposed disks, the central disk being the driven disk and the two lateral disks being driving disks, at least two alternatively active driving means, coupled with the driving disks respectively, a pin projecting on both sides of the central disk, an elastic wire, provided with bent portions at its ends, said bent portions impinging on the peripheral portions of the driving disks and said wire being provided with further bent portions wound around the projecting ends of the aforesaid pin, said elastic wire thus coupling the lateral disks with the central disk for one direction of relative movement of the lateral driving disks relatively to the central driven disk.

4. A clutch mechanism for coupling a driven shaft alternatively with a plurality of driving mechanisms, comprising a driven member mechanically connected with the driven shaft and a driving disk mechanically connected with each driving mechanism, a frictional coupling means including a resilient element fixed to the driven member and provided with a bent portion frictionally engaging the driving disk connected with the driving mechanism, said resilient element coupling the driven member with the driving disk when the driving disk leads with respect to the driven member, while uncoupling the driven member from the driving disk when the last named disk lags behind the driven member.

5. A clutch mechanism for coupling a driven shaft alternatively with two driving mechanisms as claimed in claim 4 wherein the frictional coupling means for the driven member and for the two driving disks located on both sides of the driven member consists of a single resilient element fixed on both sides of the driven member.

IVAN TREPANIER.

REFERENCES CITED

The following references are of record in the file of this patent:

UNITED STATES PATENTS

| Number | Name | Date |
| --- | --- | --- |
| 1,195,547 | Yaw | Aug. 22, 1916 |
| 2,108,931 | Trepanier | Feb. 22, 1938 |
| 2,146,499 | Butherus | Feb. 7, 1939 |
| 2,192,329 | Pudelko | Mar. 5, 1940 |

FOREIGN PATENTS

| Number | Country | Date |
| --- | --- | --- |
| 334,339 | Great Britain | Sept. 4, 1930 |
| 374,984 | Great Britain | June 23, 1932 |